(12) United States Patent
Gajda

(10) Patent No.: US 12,728,728 B2
(45) Date of Patent: Sep. 8, 2026

(54) INSULATED FEED-THROUGH CONNECTOR

(71) Applicant: Progress Rail Locomotive Inc., LaGrange, IL (US)

(72) Inventor: Tadeusz Andrew Gajda, Homer Glen, IL (US)

(73) Assignee: Progress Rail Locomotive Inc., LaGrange, IL (US)

( * ) Notice: Subject to any disclaimer, the term of this patent is extended or adjusted under 35 U.S.C. 154(b) by 440 days.

(21) Appl. No.: 18/531,198

(22) Filed: Dec. 6, 2023

(65) Prior Publication Data

US 2025/0187444 A1 Jun. 12, 2025

(51) Int. Cl.

| | |
|---|---|
| ***B60L 5/38*** | (2006.01) |
| ***B60L 5/40*** | (2006.01) |
| ***B60L 5/42*** | (2006.01) |
| ***B60L 50/60*** | (2019.01) |
| ***B61C 3/00*** | (2006.01) |
| ***B61C 7/04*** | (2006.01) |

(52) U.S. Cl.

CPC .................. *B60L 5/38* (2013.01); *B60L 5/40* (2013.01); *B60L 5/42* (2013.01); *B60L 50/60* (2019.02); *B61C 3/00* (2013.01); *B61C 7/04* (2013.01); *B60L 2200/26* (2013.01)

(58) Field of Classification Search

CPC ........ B60L 53/16; B60L 2200/26; B60L 5/38; B60L 5/40; B60L 5/42; B60L 50/53; B60L 50/60; B61C 3/00; B61C 7/04

See application file for complete search history.

(56) References Cited

U.S. PATENT DOCUMENTS

| | | | | |
|---|---|---|---|---|
| 2,638,056 A * | 5/1953 | Heidmann | ................ | B61C 3/00 105/49 |
| 8,151,955 B2 * | 4/2012 | Aubigny | ............. | G01R 15/142 191/2 |
| 2024/0308361 A1 * | 9/2024 | James | ..................... | B60L 50/60 |

FOREIGN PATENT DOCUMENTS

| | | | | |
|---|---|---|---|---|
| CN | 110116627 A | * | 8/2019 | ................ B60L 5/38 |
| CN | 110203086 A | * | 9/2019 | ................ B60L 9/00 |
| CN | 114498532 A | * | 5/2022 | ............ H02G 15/18 |
| CN | 216773582 U | * | 6/2022 | |
| DE | 19713816 A1 | * | 10/1998 | ................ B60L 5/26 |
| FR | 2954863 A1 | * | 7/2011 | ................ B60L 5/00 |
| FR | 2955304 A1 | * | 7/2011 | ................ B60L 5/18 |
| JP | 2010193570 A | * | 9/2010 | ............. B60L 58/19 |
| KR | 20090028499 A | * | 3/2009 | ............. B60L 53/11 |
| KR | 200460764 Y1 | | 6/2012 | |
| KR | 102174316 B1 | * | 11/2020 | ................ B60L 5/24 |
| WO | WO-2013161017 A1 | * | 10/2013 | ................ B60L 5/26 |
| WO | WO-2019154069 A1 | * | 8/2019 | ................ B60L 5/39 |

* cited by examiner

*Primary Examiner* — Cheng Lin

(57) ABSTRACT

A feed-through electrical connector configured to connect electrical components from an exterior to an interior of a vehicle, including a stud having a bottom end and a top end, the stud being formed from an electrically conductive material, an insulation disposed about the stud, the insulation configured to be placed in a hole of a roof of the vehicle and connect to the roof of the vehicle, a ring terminal connection disposed at the bottom end of the stud, the ring terminal connection being configured to connect the stud to electrical components on the interior of the vehicle, and a fitting disposed at the top end of the stud, the fitting configured to connect the stud to a slotted charging rail on the exterior of the vehicle.

20 Claims, 5 Drawing Sheets

INSULATED FEED-THROUGH CONNECTOR

TECHNICAL FIELD

The present disclosure generally relates to locomotives, and more specifically connectors for connecting electrical components on the exterior of the locomotive to electrical components on the interior of the locomotive.

BACKGROUND

Rail systems are utilized to transport goods and cargo across vast distances. Typical vehicles operating on rail systems include a train of cars being pulled by a locomotive. Locomotives are large machines, and due to the requirements of pulling long trains of cars, often including many tons of weight, are required to include high power energy sources.

Environmental and geopolitical concerns have motivated improvement on vehicle designs both to achieve better fuel efficiency and to reduce environmental impact. Recent years have seen development of hybrid vehicles in both automotive and railway industries. Hybrid vehicles operate on two or more energy sources, typically combining an electrical motor system with batteries, or fuel cells with a conventional internal combustion engine.

Locomotives may be traditionally powered by solely internal combustion engines. Some locomotives may be hybrid vehicles, in other words, powered by hybrid power systems. Hybrid vehicles use a conventional internal combustion engine along with an electric motor supplied with power through a battery. The battery is continuously recharged by the internal combustion engine, such as with a connection to a generator.

Other locomotives may be powered by various sources including traditional fuel-injected powerplants, hybrid powerplants having fuel-injected components coupled with electric power components, fully electric powerplants, fuel cells, or any combination of the same.

Locomotives, and especially those powered by hybrid power systems and fully electric systems, may require high voltage battery packs to provide electrical power to the work machine. Large locomotives may require a great amount of electrical power and as such, the battery packs may be configured to deliver the electrical power in various capacities such as 750 volts, 1500 volts, or any other capacities as known and required. The battery packs may also be configured to deliver the electrical power using larger currents such as 200 amps, or any other currents as known and required.

Battery packs of locomotives may discharge as the electrical power contained by the battery pack is consumed by the locomotive. In order to recharge the battery packs, electrical components such as generators may be installed on the locomotive to convert rotational energy into electrical power and transfer to the battery packs. The locomotive may also be equipped with a charging system to supply electrical power to the battery packs through an external source while the locomotive is stationary.

There is a need for a connection system on the locomotive for connecting the battery pack, located on the inside of the locomotive, to electrical charging systems, located on the outside of the locomotive.

SUMMARY OF THE DISCLOSURE

In accordance with one aspect of the disclosure, a locomotive may be provided. The locomotive may have a frame having a roof, a rail engaging member supporting the frame, an engine supported by the frame, a control module configured to control operation of the locomotive, a battery, and a feed-through electrical connector configured to connect the battery to a charging rail. The feed-through electrical connector may include a stud having a bottom end and a top end, the stud being formed from an electrically conductive material. The feed-through electrical connector may include an insulation disposed about the stud, the insulation configured to be placed in a hole of the roof of the locomotive and attached to the roof of the locomotive. The feed-through electrical connector may include a ring terminal connection disposed at the bottom end of the stud, the ring terminal connection being configured to connect the stud to the battery. The feed-through electrical connector may include a fitting disposed at the top end of the stud, the fitting configured to connect the stud to a slot in the charging rail.

In accordance with another aspect of the disclosure, a feed-through electrical connector configured to connect electrical components from an exterior to an interior of a vehicle may be provided. The feed-through electrical connector may include a stud having a bottom end and a top end, the stud being formed from an electrically conductive material. The feed-through electrical connector may include an insulation disposed about the stud, the insulation configured to be placed in a hole of a roof of the vehicle and connect to the roof of the vehicle. The feed-through electrical connector may include a ring terminal connection disposed at the bottom end of the stud, the ring terminal connection being configured to connect the stud to electrical components on the interior of the vehicle. The feed-through electrical connector may include a fitting disposed at the top end of the stud, the fitting configured to connect the stud to a slotted charging rail on the exterior of the vehicle.

In accordance with yet another aspect of the disclosure, a method for mounting a feed-through electrical connector to a roof of a locomotive may be provided. The method may include providing the locomotive having a frame including the roof, a rail engaging member supporting the frame, an engine supported by the frame, a control module configured to control operation of the locomotive, and a battery. The method may include cutting a hole in the roof to correspond to the feed-through electrical connector. The method may include placing the feed-through electrical connector through the hole. The method may include fastening the feed-through electrical connector to the roof. The method may include connecting a battery to a ring terminal connection at a bottom of the feed-through electrical connector. The method may include connecting a charging rail to a fitting at a top of the feed-through electrical connector.

These and other aspects and features of the present disclosure will be more readily understood when read in conjunction with the accompanying drawings.

DETAILED DESCRIPTION

Figure 1:
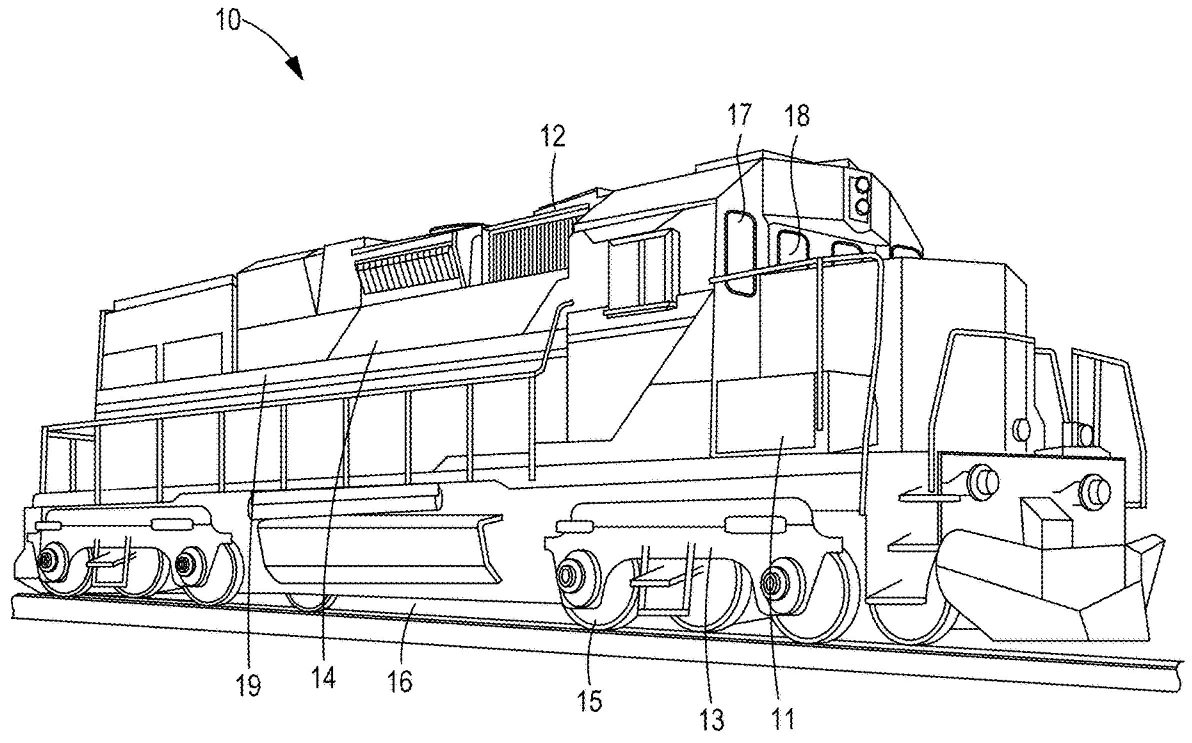
FIG. 1 is a perspective view of a locomotive constructed in accordance with an embodiment of the present disclosure.

Referring now to the drawings, and with specific reference to FIG. 1, a locomotive is depicted and generally referred to using reference numeral 10. While the locomotive 10 is depicted, it should be noted that a type of vehicle used is merely exemplary and illustrative in nature. It will be acknowledged that the teachings of the present disclosure can be similarly applied to other types of vehicles including but not limited to automobiles, on and off highway trucks, excavators, track-type tractors, mining vehicles, and other vehicles known to persons skilled in the art.

Locomotives are used to transport materials across large distances, pulling a train of cars on rail tracks. The exemplary locomotive 10 is supported by a frame 11 with a roof 12. The locomotive 10 may include a drivetrain 13 powered by a engine 14 and driving rail engaging members 15 in contact with rails 16 and supporting the frame 11 in order to operate the locomotive 10. The locomotive 10 may also include an operator cabin 17 for an operator to control the operation of the locomotive 10. The operator cabin 17 may include a control module 18 for the operator to use to direct the locomotive 10.

The locomotive 10 may include the engine 14 that is powered by a hybrid system. With a hybrid system, the engine 14 may include a traditional internal combustion engine working alongside an electric motor to provide power to the drivetrain 13. The locomotive 10 may also be powered by a fully electric system, wherein the engine 14 may include only the electric motor providing power to the drivetrain 13.

In order to store electrical power on the locomotive, a battery 19 may be provided on the inside of the frame 11. The battery 19 may be used to supplement a hybrid system with electrical energy, or be the sole source of electrical power for a fully electric locomotive. The battery may drain electrical power, and may be recharged by electrical equipment such as generators to convert kinetic energy of the locomotive 10 into electrical energy.

In order to assist the locomotive 10 with charging the battery 19, charging systems may be implemented on the locomotive. The charging systems may be configured to deliver electrical power to the battery 19 from an external source relative to the locomotive 10.

Figure 2:
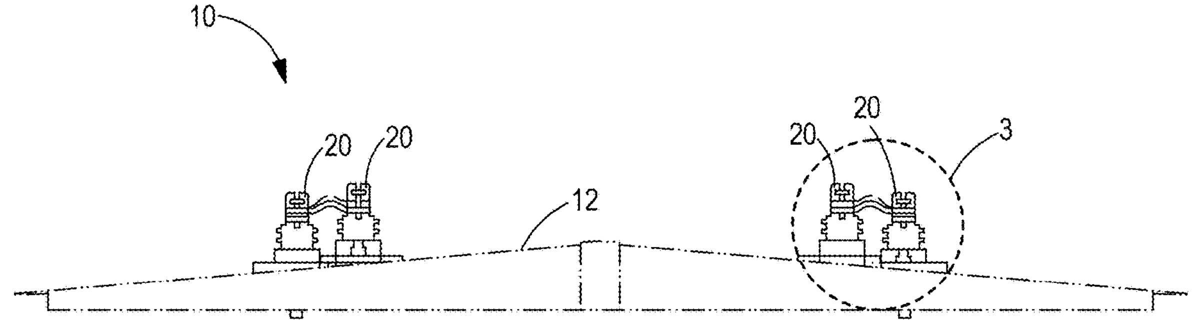
FIG. 2 is a cross-sectional front view of the roof of a locomotive constructed in accordance with an embodiment of the present disclosure.
Figure 3:
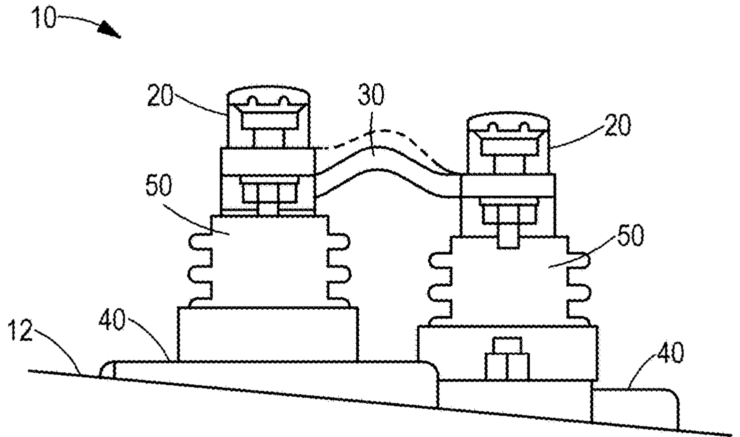
FIG. 3 is an enlarged cross-sectional view of section 3 of FIG. 2 constructed in accordance with an embodiment of the present disclosure.

The charging system may be mounted to the roof 12 of the locomotive 10. FIGS. 2-3 show a cross sectional frontal view of the roof 12 of the locomotive with charging rails 20 mounted to the roof 12. When the locomotive 10 is in need of charging, the locomotive 10 may be guided to a dock that may be configured to have an electrical power distribution point that interfaces with the roof 12 of the locomotive. The charging rails 20 may be configured to provide positive (+) and negative (−) connection points to connect to the power distribution points of the dock. In this manner, power may be provided to the battery 19 of the locomotive 10 without the need to provide additional electrical connections to the locomotive 10 when it is stationary.

The charging rails 20 may formed of electrically conductive metal, or any other electrically conductive material as known. The charging rails 20 may be staggered in position along the roof 12, and may be electrically interconnected through a bridge 30. In the locomotive 10 of FIG. 3, the bridge 30 is formed in a copper braid, however, the bridge 30 may be formed of any other electrically conductive material as known.

In order for electrical power to solely be delivered to the charging rails 20, and to avoid inadvertently charging or electrically grounding the roof 12, the charging rails 20 may be electrically isolated from the roof 12. A feed-through electrical connector 50 may be placed on a mounting point 40 of the roof 12. The mounting point 40 may provide a flat point on the roof 12 to provide for consistent placement of the charging rails 20. The feed-through electrical connector 50 may simultaneously isolate the charging rails 20 from the roof 12, and provide an electrical connection through the roof in order to connect the charging rails 20 to the battery 19.

Figure 4:
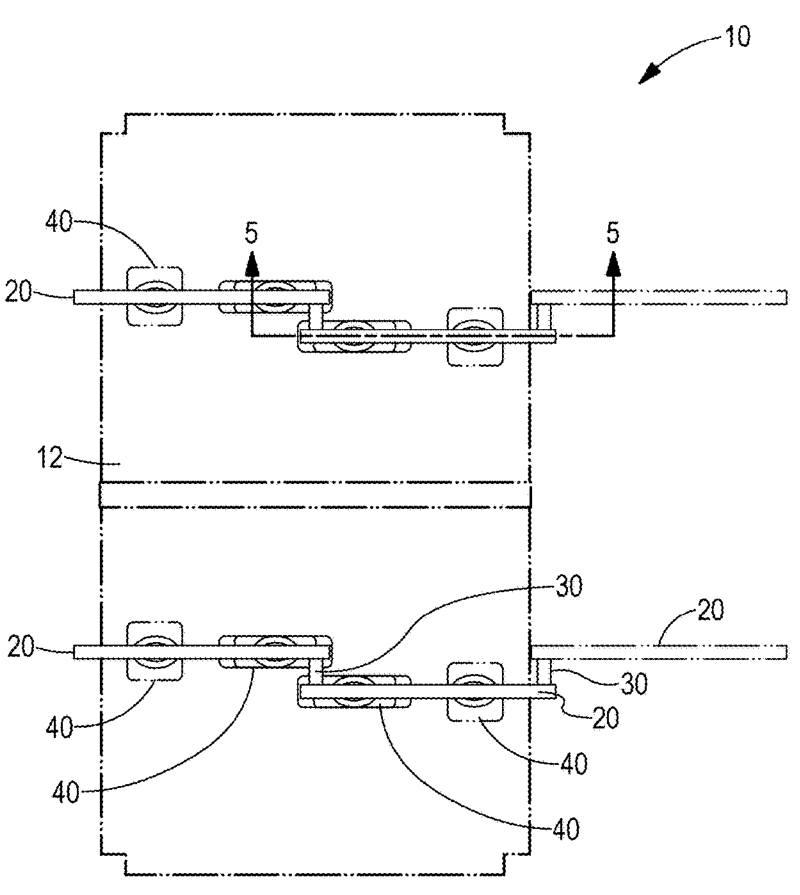
FIG. 4 is a top view of a portion of a roof of a locomotive constructed in accordance with an embodiment of the present disclosure.

FIG. 4 shows a top overhead view of a portion of the locomotive 10 having the charging system. As shown in FIG. 4, the charging rails 20 may run along the length of the roof 12 of the locomotive 10, may be staggered along the roof 12, and may be electrically interconnected through a bridge 30.

Figure 5:
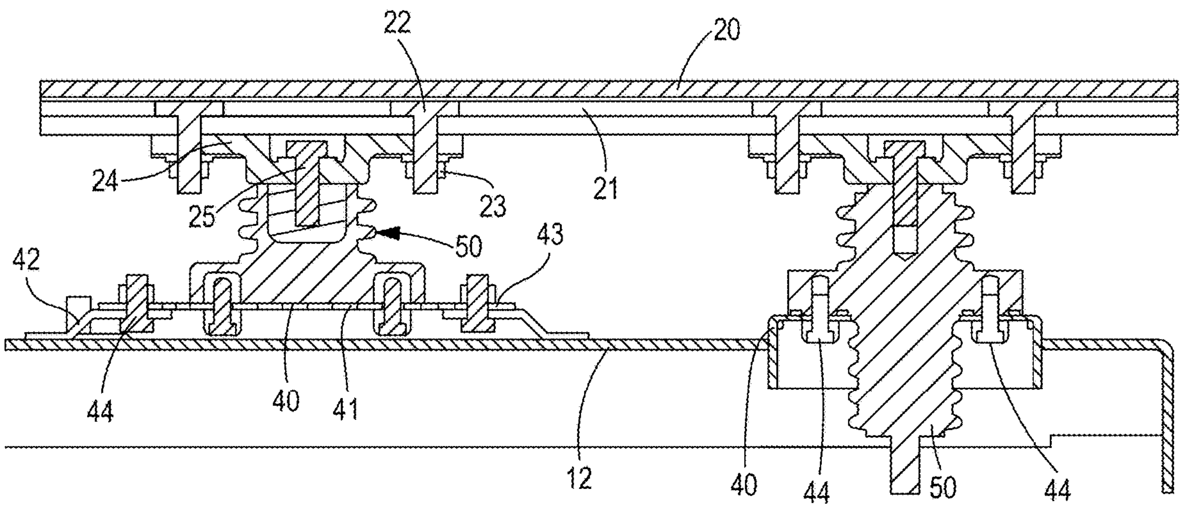
FIG. 5 is a cross-sectional view of the roof of a locomotive constructed in accordance with an embodiment of the present disclosure, taken along line 5-5 of FIG. 4.

FIG. 5 shows a cut away view of a portion of the charging system on the roof 12 of the locomotive 10 of FIG. 4. The mounting point 40 on the roof 12 may either be formed into the roof 12, or may be formed by a first plate 41 and a second plate 42 connected by roof fasteners 43. The feed-through electrical connector 50 may be fitted to the mounting point 40 through connector fasteners 44. However, other mounting means may be utilized as known.

As shown by FIG. 5, the feed-through electrical connector 50 extends through the roof 12 and provides an electrical mounting point inside the locomotive 10 to connect to the battery 19. In order to connect to the feed-through electrical connector 50, the charging rails 20 are provided by a flexible mounting system. The charging rails 20 include a slot 21, in which a T-fitting 22 corresponding to the slot 21 may be placed. The T-fitting 22 may be configured to be slidable within the slot 21 such that the charging rails 20 may be adjustably mounted. The T-fitting 22 may be configured to be connected to a mounting plate 24, which in turn may be configured to be connected to a top portion of the feed-through electrical connector 50. As shown in FIG. 5, the T-fitting 22 may include a threaded portion, and may be fastened through the mounting plate 24 and secured with nuts 23. In turn, the mounting plate 24 may be fastened to the feed-through electrical connector 50 with a connector bolt 25. While the mounting mechanisms of the charging system of FIG. 5 are illustrated as threaded fasteners, other mounting means may be utilized as known.

Figure 6:
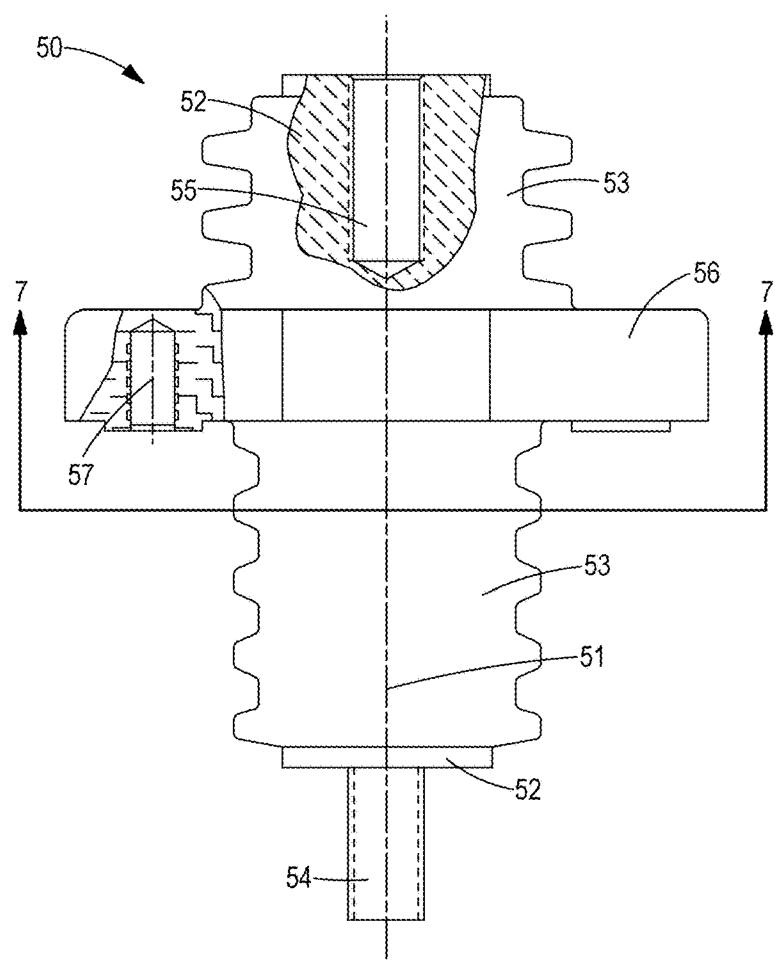
FIG. 6 is a cross-sectional view of a feed-through electrical connector constructed in accordance with an embodiment of the present disclosure.
Figure 7:
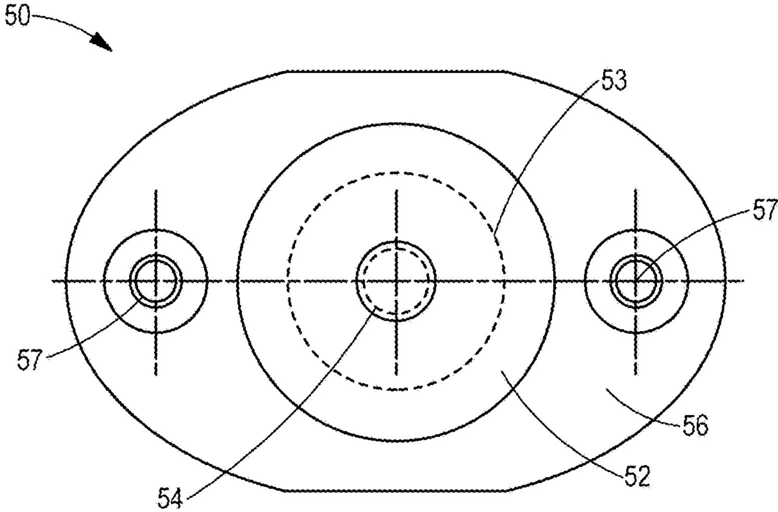
FIG. 7 is a cross-sectional view of the feed-through electrical connector constructed in accordance with an embodiment of the present disclosure, taken along line 7-7 of FIG. 6.

FIGS. 6-7 illustrate the feed-through electrical connector 50 in greater detail. The feed-through electrical connector 50 may be configured as a largely cylindrical body with a centerline 51. A stud 52 may be formed about the centerline 51, and may be formed of an electrically conductive metal, such as copper, although other electrically materials as known may be utilized. In order to electrically isolate the roof 12 from the stud 52, an insulation 53 may be disposed about the stud 52, and may be formed of an electrically isolating material such as rubber, although other isolators as known may be utilized.

In order to connect to the battery 19 inside the locomotive, a ring terminal connection 54 may be provided at a bottom end of the stud 52. The ring terminal connection 54 may be formed as a threaded rod, and may be configured to connect a ring terminal, wired to connect to the battery 19, to the threaded rod, being secured with a threaded fastener, such as a nut. At a top end of the stud 52, a fitting 55 may be provided in order to connect to the charging rails 20. As shown in the feed-through electrical connector 50 of FIGS. 4-7, the fitting 55 may be formed as a threaded hole, configured to be connected to the mounting plate 24 through the connector bolt 25.

A flange 56 may be provided on an exterior of the insulation 53 such that the feed-through electrical connector 50 may be secured to the roof 12. Threaded holes 57 may be provided on the flange 56 such that the connector fasteners may be fit through the mounting point 40 and into the flange 56, thereby securing the feed-through electrical connector 50 to the roof 12.

INDUSTRIAL APPLICABILITY

In operation, the teachings of the present disclosure can find applicability in many industries including but not limited to locomotives used in the rail industry. While depicted and described in conjunction with a locomotive, such teachings can also find applicability with other machines such as automobiles, on and off highway trucks, excavators, track-type tractors, mining vehicles, and the like.

Figure 8:
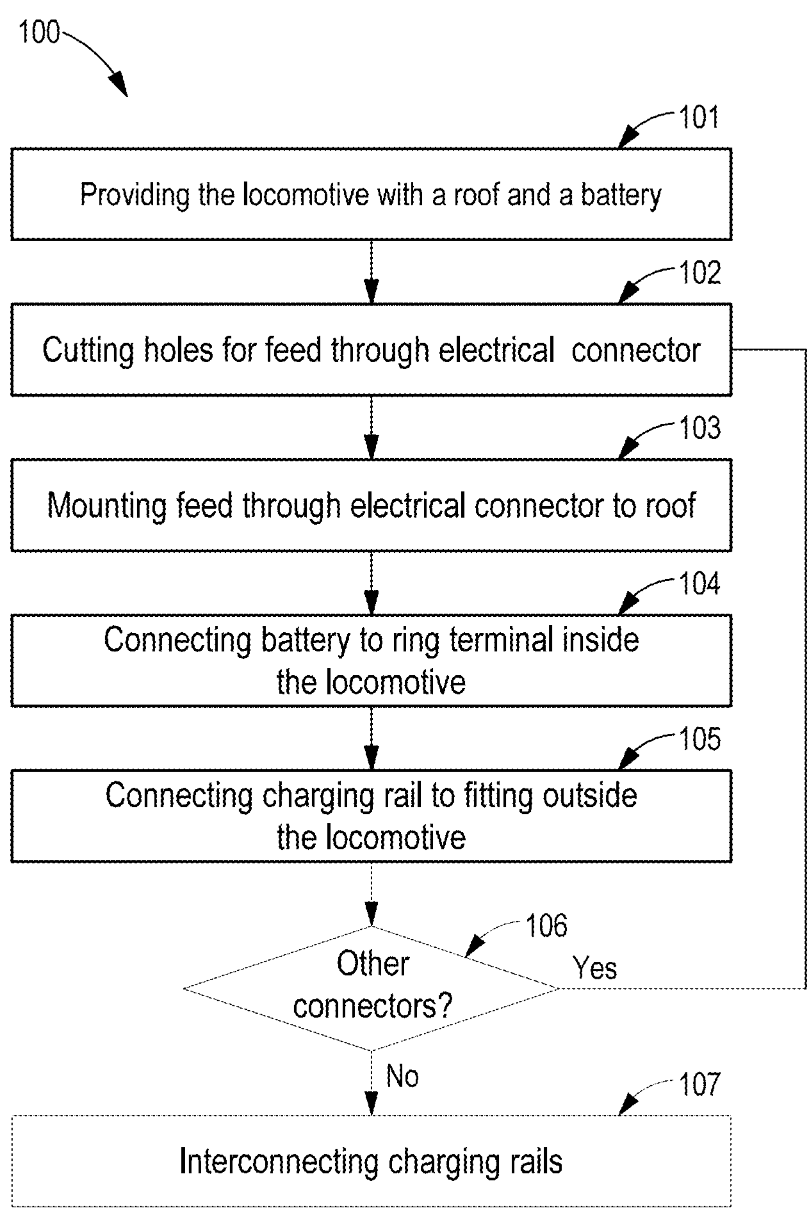
FIG. 8 is a flowchart depicting a sample sequence of steps for mounting a feed-through electrical connector to a roof of a locomotive, which may be practiced in accordance with the locomotive of the present disclosure.

FIG. 8 illustrates a visual representation of a method 100 of mounting the feed-through electrical connector 50 to the roof 12 of the locomotive 10. In a first step 101, the locomotive 10 is provided having the frame 11, the roof 12, the rail engaging members 15 supporting the frame 11, the engine 14 supported by the frame 11, the control module 18 configured to control operation of the locomotive 10, and the battery 19.

The charging system is then added to the roof 12 of the locomotive 10. In a second step 102, several holes are cut into the roof 12. Specifically, for the feed-through electrical connector 50, a main hole to fit about the insulation 53, and holes to allow the connector fasteners 44 to fit into the threaded holes 57 of the flange 56, are cut into each mounting point 40. In a third step 103, the feed-through electrical connector 50 is mounted to the mounting point 40 of the roof 12 through the connector fasteners 44 fitting into the threaded holes 57.

In a fourth step 104, the battery 19 is connected to the feed-through electrical connector 50 by wiring the battery 19 to a ring terminal and fitting the ring terminal to the ring terminal connection 54. The ring terminal may be secured the ring terminal connection 54 via a nut, or any other electrically conductive connection as known.

The charging rails 20 are then connected to the feed-through electrical connector 50. In a fifth step 105, the mounting plate 24 may be connected to the fitting 55 through the connector bolt 25. The T-fitting 22 may be placed through the slot 21 of the charging rails 20, and may be fit through the mounting plate 24. The charging rails 20 may be adjusted into position, and locked into place through fastening the nuts 23 to the T-fitting 22.

In a sixth step 106, it is determined if more of the feed-through electrical connector 50 are required, and if so, the second step 102 through the fifth step 105 is repeated for each additional feed-through electrical connector 50. Once a sufficient number of the feed-through electrical connector 50 are provided, the charging rails 20 may be electrically interconnected by attaching the bridge 30.

The method 100 of mounting the feed-through electrical connector 50 to the roof 12 of the locomotive 10 allows for secure mounting of an external charging means for allowing the battery 19 of the locomotive 10 to be charged. The method 100 allows for providing the locomotive 10 with a secure, weather resistant electrical connection between a charger and the battery 19 such that additional cables do not need to be run to the locomotive 10 to charge the battery 19 when it is stationary.

Providing a charging system for the locomotive 10 in such a manner allows for a universal dock to be used on sever different iterations of the locomotive 10, with efficient charging of the battery 19 in each iteration. Use of the feed-through electrical connector 50 allows for addition of the charging system onto existing locomotive designs, and the charging system as described may be retrofit onto currently existing locomotives.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A locomotive, comprising:
- a frame having a roof;
- a rail engaging member supporting the frame;
- an engine supported by the frame;
- a control module configured to control operation of the locomotive;
- a battery; and
- a feed-through electrical connector configured to connect the battery to a charging rail, including:
  - a stud having a bottom end and a top end, the stud being formed from an electrically conductive material;
  - an insulation disposed about the stud, the insulation configured to be placed in a hole of the roof of the locomotive and attached to the roof of the locomotive;
  - a ring terminal connection disposed at the bottom end of the stud, the ring terminal connection being configured to connect the stud to the battery;
  - a fitting disposed at the top end of the stud, the fitting configured to connect the stud to a slot in the charging rail.

2. The locomotive of claim 1, wherein the locomotive is a hybrid locomotive, and the engine includes an internal combustion engine, and an electric motor.

3. The locomotive of claim 1, wherein the locomotive is a fully electric locomotive and the engine includes an electric motor.

4. The locomotive of claim 1, wherein the stud is made from copper.

5. The locomotive of claim 1, further comprising a plurality of charging rails, each of the plurality of charging rails being electrically interconnected.

6. The locomotive of claim 1, wherein the insulation includes a flange having a threaded hole for connecting the feed-through electrical connector to the roof via a threaded fastener.

7. The locomotive of claim 1, wherein the feed-through electrical connector is rated for a minimum of 200 amps of current and 1500 VDC voltage.

8. A feed-through electrical connector configured to connect electrical components from an exterior to an interior of a vehicle, comprising:

a stud having a bottom end and a top end, the stud being formed from an electrically conductive material;

an insulation disposed about the stud, the insulation configured to be placed in a hole of a roof of the vehicle and connect to the roof of the vehicle;

a ring terminal connection disposed at the bottom end of the stud, the ring terminal connection being configured to connect the stud to the electrical components on the interior of the vehicle; and a fitting disposed at the top end of the stud, the fitting configured to connect the stud to a slotted charging rail on the exterior of the vehicle.

9. The feed-through electrical connector of claim 8, wherein the insulation includes a flange having a threaded hole for connecting the feed-through electrical connector to the roof via a threaded fastener.

10. The feed-through electrical connector of claim 8, wherein the stud is made from copper.

11. The feed-through electrical connector of claim 8, wherein the feed-through electrical connector is rated for a minimum of 200 amps of current and 1500 VDC voltage.

12. The feed-through electrical connector of claim 8, wherein the vehicle is a locomotive.

13. The feed-through electrical connector of claim 12, wherein the locomotive includes an engine, the engine having a hybrid power system including an internal combustion engine, and an electric motor.

14. The feed-through electrical connector of claim 12, wherein the locomotive is a fully electric locomotive, and the locomotive is driven by an electric motor.

15. A method for mounting a feed-through electrical connector to a roof of a locomotive, comprising:

providing the locomotive having a frame including the roof, a rail engaging member supporting the frame, an engine supported by the frame, a control module configured to control operation of the locomotive, and a battery;

cutting a hole in the roof to correspond to the feed-through electrical connector;

placing the feed-through electrical connector through the hole;

fastening the feed-through electrical connector to the roof;

connecting the battery to a ring terminal connection at a bottom of the feed-through electrical connector; and connecting a charging rail to a fitting at a top of the feed-through electrical connector.

16. The method of claim 15, wherein the step of cutting the hole in the roof includes cutting an additional hole to match with a corresponding threaded hole on a flange of the feed-through electrical connector.

17. The method of claim 16, wherein the step of fastening the feed though electrical connector to the roof includes placing a threaded fastener through the additional hole and into the corresponding threaded hole, thereby fastening the feed-through electrical connector to the roof.

18. The method of claim 15, wherein the step of cutting the hole through the step connecting the charging rail are repeated for a plurality of feed though electrical connectors, and a plurality of charging rails.

19. The method of claim 18, further comprising the step of interconnecting the plurality of charging rails.

20. The method of claim 15, further comprising the step of connecting the charging rail to a power source, thereby providing electrical power to the battery through the feed-through electrical connector.

* * * * *